(12) United States Patent
Bickerstaff et al.

(10) Patent No.: US 8,994,614 B2
(45) Date of Patent: Mar. 31, 2015

(54) HEAD MOUNTABLE DISPLAY

(71) Applicant: Sony Computer Entertainment Europe Limited, London (GB)

(72) Inventors: Ian Henry Bickerstaff, London (GB); Simon Mark Benson, London (GB)

(73) Assignee: Sony Computer Entertainment Europe Limited (GB)

( * ) Notice: Subject to any disclaimer, the term of this patent is extended or adjusted under 35 U.S.C. 154(b) by 86 days.

(21) Appl. No.: 13/649,630

(22) Filed: Oct. 11, 2012

(65) Prior Publication Data
US 2014/0104142 A1    Apr. 17, 2014

(51) Int. Cl.
G09G 5/00 (2006.01)
G02B 27/01 (2006.01)

(52) U.S. Cl.
CPC .......... G02B 27/017 (2013.01); G02B 27/0172 (2013.01)
USPC .......................................................... 345/8

(58) Field of Classification Search
CPC .. G02B 27/01; G02B 27/017; G02B 27/0172; G02B 27/0176; G02B 2027/0178; G02B 2027/0132; G02B 2027/0134; G02B 2027/0123; G06F 3/01; G06F 3/011
USPC ............... 345/7–8; 348/42–60; 359/458, 462, 359/618, 629–630
See application file for complete search history.

(56) References Cited

U.S. PATENT DOCUMENTS

| 8,212,859 B2 | 7/2012 | Tang et al. | |
| 2008/0088936 A1* | 4/2008 | Tang et al. | 359/630 |
| 2010/0039353 A1* | 2/2010 | Cernasov | 345/8 |
| 2010/0157433 A1 | 6/2010 | Mukawa et al. | |
| 2011/0273543 A1* | 11/2011 | Ushio et al. | 348/54 |
| 2012/0050272 A1 | 3/2012 | Iwata et al. | |
| 2012/0274653 A1* | 11/2012 | Tang et al. | 345/593 |

FOREIGN PATENT DOCUMENTS

EP    1731943 A4    9/2010

OTHER PUBLICATIONS

International Search Report and Written Opinion for Application No. PCT/GB2013/052644 dated Dec. 13, 2013.

* cited by examiner

*Primary Examiner* — Dwayne Bost
*Assistant Examiner* — Ivelisse Martinez Quiles
(74) *Attorney, Agent, or Firm* — Lerner, David, Littenberg, Krumholz & Mentlik, LLP

(57) ABSTRACT

A head-mountable display comprises a frame configured to be mounted on a user's head. The frame defines left and right-hand eye display positions that are positioned in front of the respective eyes of the user. A left-hand display element is mounted with respect to the left-hand eye display position, and is operable to provide an image from a left-hand video signal to the user's left eye. A right-hand display element mounted with respect to the right-hand eye display position, and is operable to provide an image from a right-hand video signal to the user's right eye. At least one light emitting element is positioned on a right-hand periphery of the left-hand display element and at least one light emitting element is positioned on a left-hand periphery of the right-hand display element. A controller controls light emitted by the light emitting elements dependent upon the video signals to reduce luning.

12 Claims, 10 Drawing Sheets

HEAD MOUNTABLE DISPLAY

BACKGROUND

1. Field of the Invention

This invention relates to head-mountable displays.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

It is to be understood that both the foregoing general description of the invention and the following detailed description are exemplary, but are not restrictive, of the invention.

SUMMARY

According to one aspect of the present invention a head-mountable display apparatus is provided comprising:

a frame configured to be mounted on a user's head, the frame defining a left-hand eye display position and a right-hand eye display position which, when in use, are positioned in front of the respective eye of the user;

a left-hand display element mounted with respect to the left-hand eye display position, the left-hand display element being operable to provide an image from a left-hand video signal to the left-hand eye of the user;

a right-hand display element mounted with respect to the right-hand eye display position, the right-hand display element being operable to provide an image from a right-hand video signal to the right-hand eye of the user;

at least one light emitting element positioned adjacent a right-hand periphery of the left-hand display element;

at least one light emitting element positioned adjacent a left-hand periphery of the right-hand display element; and a controller operable to control light emitted by the light emitting elements dependent upon the video signals so as to reduce luning, wherein the light emitted by the at least one light emitting element on the left-hand display element is dependent upon image content of the right-hand or left-hand image, and the light emitted by the at least one light emitting element on the right-hand display element is dependent upon the image content of the left or right image respectively.

Increasing the field of view (FOV) of an HMD is desirable because it can contribute to a more immersive experience for the user. A low-cost method to achieve an increased FOV in an HMD is to decrease the binocular overlap by "toeing-out" the display elements. The expression "toeing out" is derived from an automotive term indicating the angle that the front wheels of a car make with the forward direction when the car is steering directly ahead. If the planes of the two front wheels in a forward direction point away from one another (or in other words, if the front edges are further away from one another than the rear edges), the wheels are said to be toed out. If the planes of the wheels point towards one another in a forward direction, the wheels are said to be toed in. Applying this as an analogy to the relative positions of two display elements in an HMD, either the relative angle of the display elements (or at least, of the virtual images corresponding to the display elements) and/or the lateral displacement of the display elements can be adjusted so as to increase or reduce the apparent overlap or binocular zone as perceived by the viewer in use. If the angle and/or lateral displacement are adjusted so as to decrease the overlap or binocular zone, the display elements may be said to be toed out. If the angle and/or lateral displacement are adjusted so as to increase the overlap or binocular zone, the display elements may be said to be toed in.

However, in toeing out the display elements, a problem known as so-called retinal rivalry may occur because only single images are provided to the user's eyes where binocular images are normally expected. A result of this is that a psychophysical effect termed "luning" can occur, which manifests itself as darkened portions in the image rendered by the brain of the user that correspond to the inner edges of the display elements. Consequently, there are practical limits to the extent to which display elements of an HMD can be toed-out. The present invention can mitigate the effect of luning by introducing light which is dependent upon the periphery of the images provided to the user's eye into the central nasal region of the an HMD. This technique can reduce luning, therefore allowing display elements of an HMD to be toed-out without necessarily adversely affecting the FOV or user experience.

In one example the at least one light emitting element on the left-hand display is positioned only on or adjacent the right-hand periphery of the left-hand display element and the at least one light emitting element on or adjacent the right-hand display element is positioned only on the left-hand periphery of the right-hand display element In one embodiment of the invention a colour of the light emitted by the at least one light emitting element on the left-hand display element corresponds to a colour of the right-hand periphery of the image provided by the left-hand display element, and a colour of the light emitted by the at least one light emitting element on the right-hand display element corresponds to a colour of the left-hand periphery of the image provided by the right-hand display element.

Controlling the light emitting elements to emit light having a colour which corresponds to the colours of the periphery of the images provided by the relevant display elements improves the mitigation of luning. When corresponding colours are emitted the images provided by the display elements will be more accurately and realistically extended into the central nasal area of the user's vision therefore reducing luning and allowing for an increased FOV via toeing-out of the display elements.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
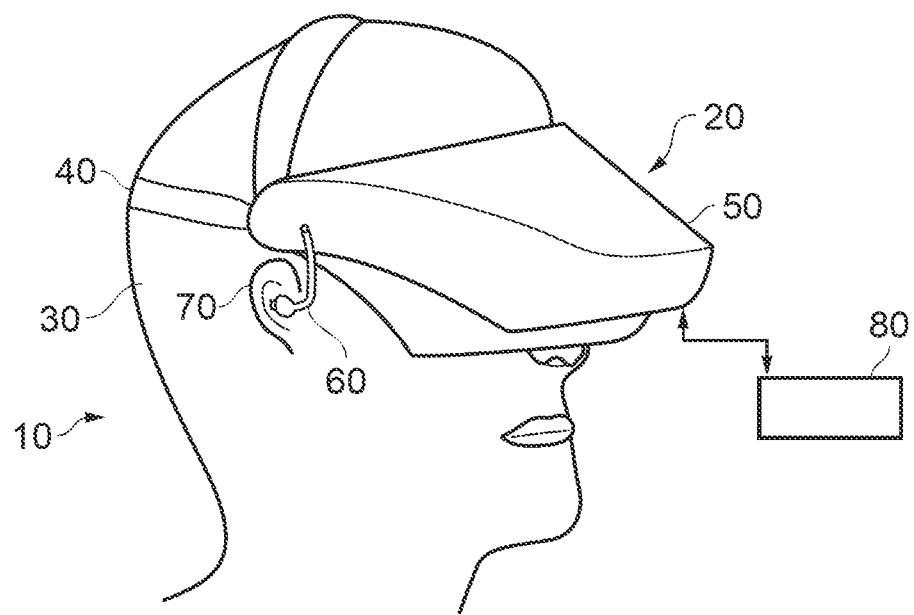
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth (R) connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display apparatus comprising a frame to be mounted onto an observer's head, the frame defining a left-hand eye display position (as drawn, in front of the user's left eye) and a right-hand eye display position (as drawn, in front of the user's right eye) which, in use, are positioned in front of a respective eye of the observer. The apparatus also comprises a left-hand display element mounted with respect to left-hand eye display position, the left-hand display element being operable to provide a virtual image of a video display of a left-hand video signal from a video signal source to the left-hand eye of the user, and a right-hand display element mounted with respect to the right-hand eye display position, the right-hand display element being operable to provide a virtual image of a video display of a right-hand video signal from a video signal source to the right-hand eye of the user.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment.

In the example of FIG. 1, a separate respective display element is provided for each of the user's eyes, thereby creating a binocular HMD. A schematic plan view of how this is achieved is provided in FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
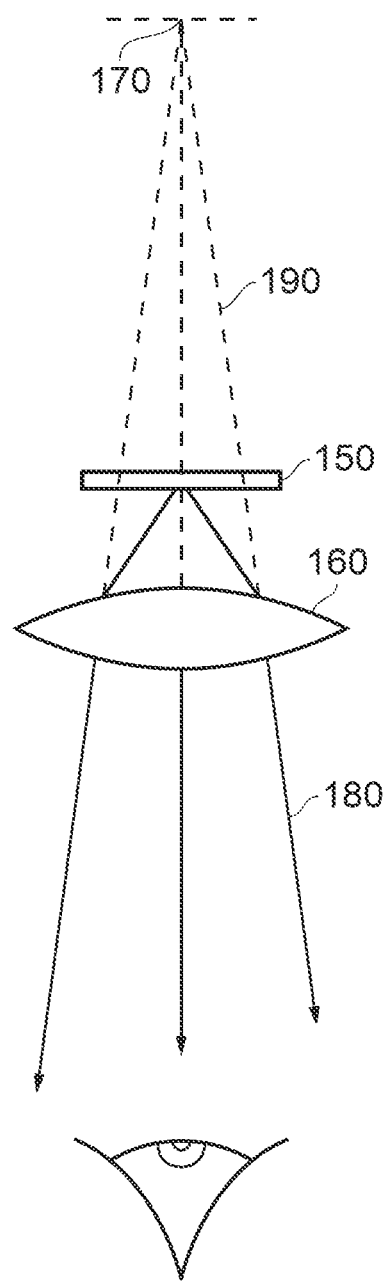
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

FIGS. 4A to 4D illustrate alternative examples of the display elements 150 where the accompanying optics 160 have been omitted for simplicity.

Figure 4A:
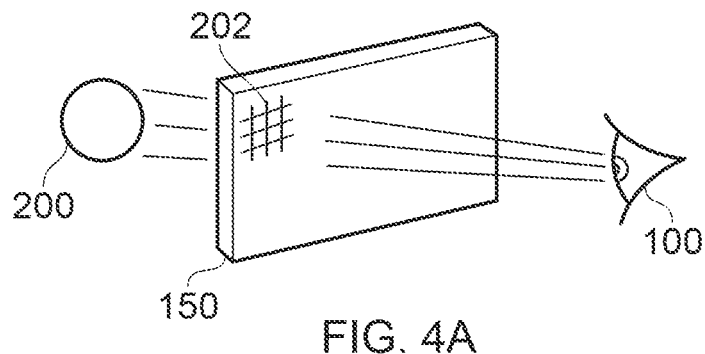
FIGS. 4A to 4D schematically illustrate a number of different types of displays for use in an HMD.

FIG. 4A illustrates a transmissive display element which comprises a matrix of pixels 202 and a light source 200 that illuminates the display element from the rear. The pixels of the display element are adjusted according to a video signal in order to control the transmission of light through the display so that an image is provided to the user's eye 100. An example of such a display is a backlight liquid crystal display (LCD).

Figure 4B:
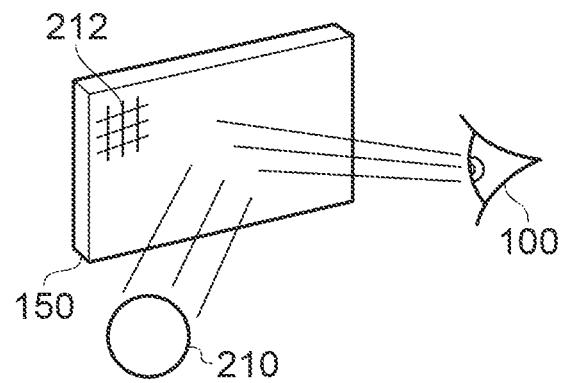

FIG. 4B illustrates a reflective display element 150 where a light source or image source 210 illuminates the display element from the front of the display element 150. The display element 150 may be an active element which comprises a matrix of pixels 212 that control the reflection of light in accordance with a video signal in order to provide an image to user's eye. Alternatively the display element 150 may be passive and does not alter the incident light but instead reflects the image produced by the image source 210 in accordance with a video signal in order to provide an image to the user's eye. In one example the display elements illustrated in FIGS. 4A and 4B may be combined such that the display element is partially transmissive and partially reflective, thereby allowing light from outside of the HMD to pass through to the user's eye as well as providing an image to the user's eye via reflected light from the image source. Such an arrangement allows an image provided by the HMD to be superimposed upon images from an external environment.

Figure 4C:
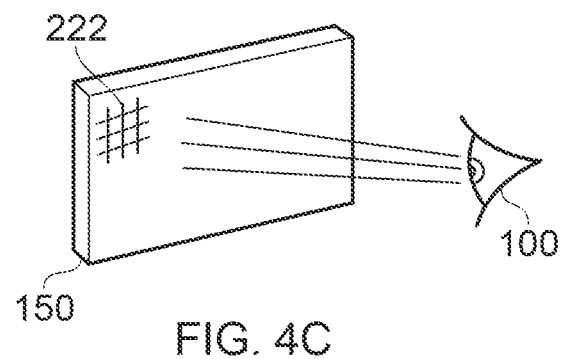

FIG. 4C illustrates a self-emissive display element 150 where the display element comprises a matrix of pixels 222 which emit light according to a video signal in order to provide an image to the user's eye 100. An example of a self-emissive display is an organic light emitting diode (OLED) display or cathode ray tube display (CRT).

Figure 4D:
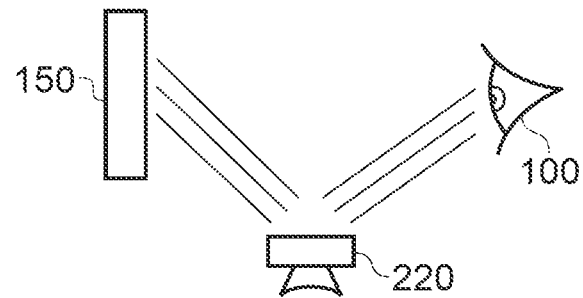

FIG. 4D illustrates a scanning display where the display element comprises an array of light emitting elements such as LEDs. Light emitted from the display element is scanned across the eye of the user using a modulator 220 in accordance with a video signal in order to provide an image to the user's eye.

Figure 2:
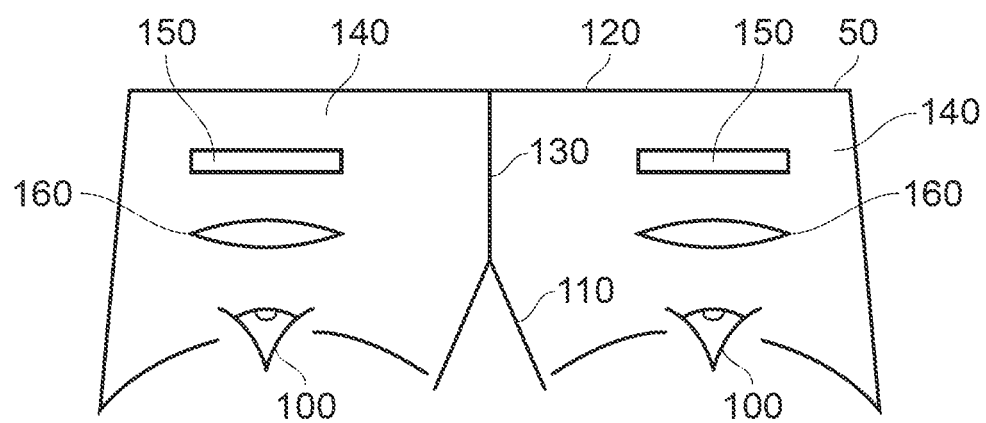
FIG. 2 schematically illustrates a plan view of an HMD.

Although in FIG. 4A to 4C the light sources are illustrated as separate to the display element 150, in practice their light sources are often integrated into a single package, for instance as found in a backlit LCD screen. Consequently, throughout this disclosure a display element is illustrated a single element, for example as depicted in FIG. 2.

In a binocular HMD different images are provided to each eye of the user. In contrast to monocular (single image provided to one eye) and biocular (a same image provided to both eyes), a binocular HMD allows for partial binocular overlap to occur. Partial binocular overlap as opposed to full binocular overlap can increase the field of view (FOV) of an HMD because the display elements are able be toed-out in order to reduce the binocular overlap and extend the images displayed to the user further into their peripheral vision.

Figure 5:
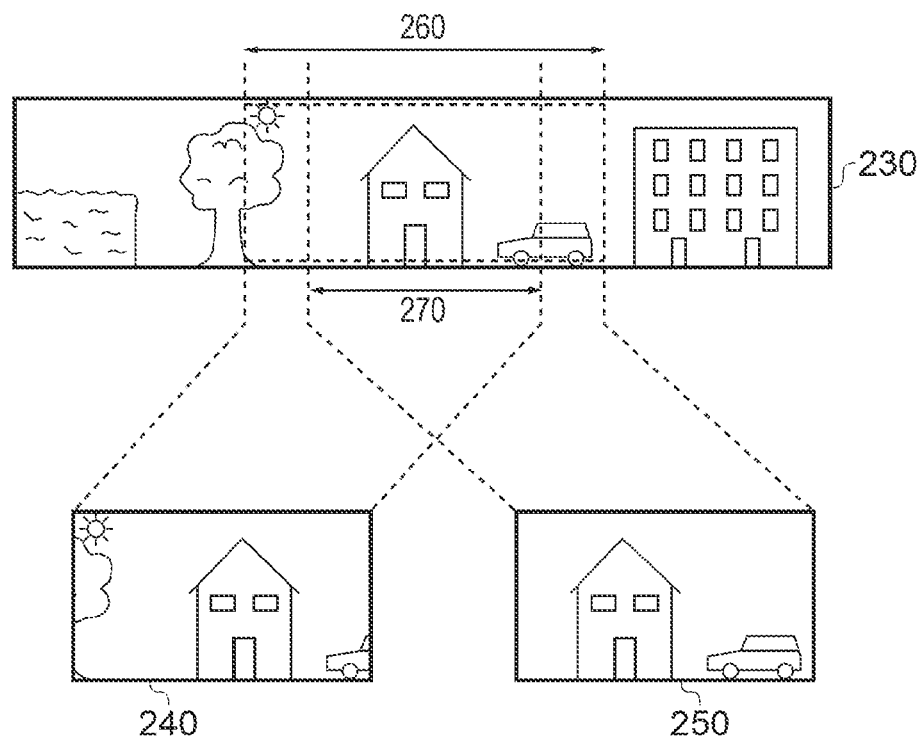
FIG. 5 schematically illustrates the images provided to the user in a partial binocular overlap HMD.

FIG. 5 illustrates images provided to a user's eyes in a binocular HMD when partial binocular overlap is present. Although the images provided to the each of the user's eyes by a binocular HMD are different they may overlap. Indeed, it is in the overlap region that a 3-D effect can be obtained. In FIG. 5 an image of a scene 230 is to be provided to the user's eyes; to achieve this a left-hand portion of the image 240 is provided to the left-hand eye of the user and a right-hand portion of the image 250 is provided to the right-hand eye of the user via a left-hand and a right-hand display element, respectively. The images 240 and 250 then overlap in region 270 and the brain of the user combines the images 240 and 250 to form an image 260 which the user sees.

Numerous design considerations are required to be taken into account when constructing a binocular HMD, one example of which is the FOV. A larger FOV may increase the sense of immersion a user experiences when using an HMD and therefore it may be beneficial to increase the FOV. An increase in the FOV may also subsequently allow an increase in viewable imagery, which may again lead to a more immersive user experience. A human FOV is approximately 200 degrees with a binocular overlap region (the region which is seen by both eyes) of about 100 degrees. Consequently, it may be desirable to attempt to mimic the human FOV and binocular overlap or simply increase the FOV in an HMD. However, to achieve an HMD with an increased FOV, higher resolution and larger display elements are usually required, which in some circumstances may be not be possible or the cost prohibitive. Consequently, other methods to increase the field of view of HMD are sought after.

Figure 6:
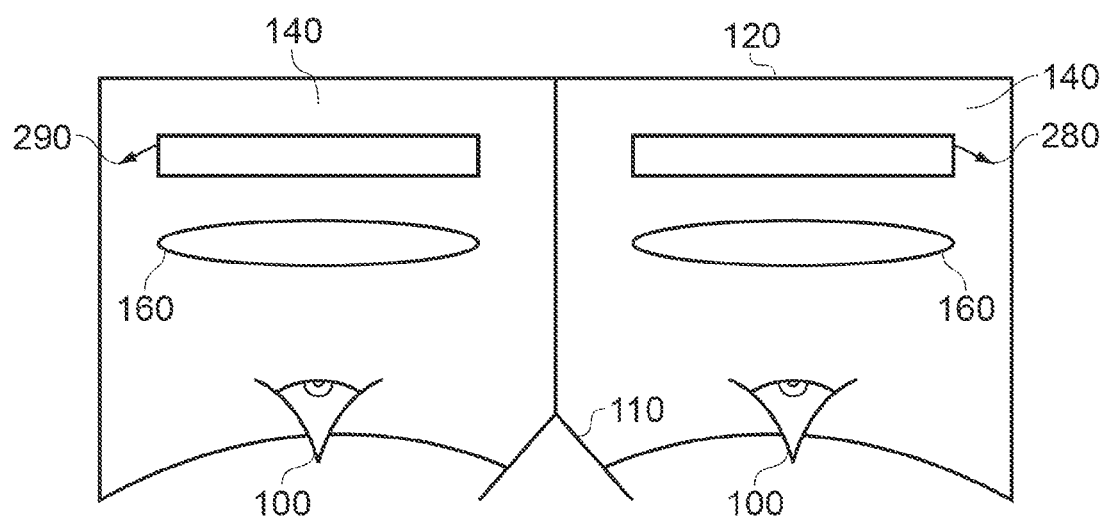
FIG. 6 schematically illustrates the toeing-out of display elements in an HMD.

FIG. 6 illustrates a method known as toeing-out that increases the FOV of an HMD. In such a method the display elements of an HMD are toed-out as shown by arrows 280 and 290 in order to reduce the binocular overlap of the display elements, thus increasing the FOV of the HMD.

Figure 7A:
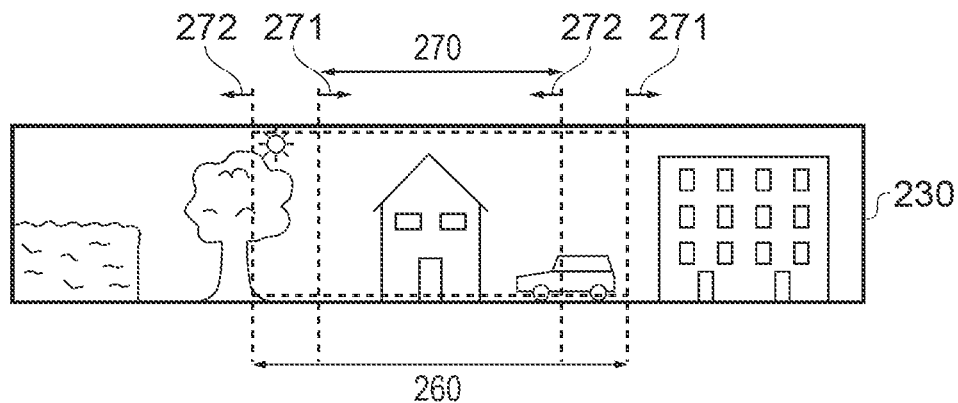
FIGS. 7A to 7C schematically illustrate the effects of the toeing-out of display elements on the images they provide in an HMD.
Figure 7B:
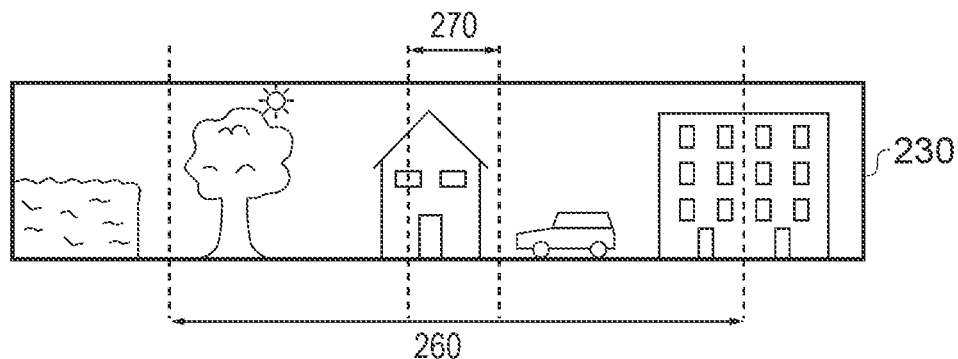
Figure 7C:
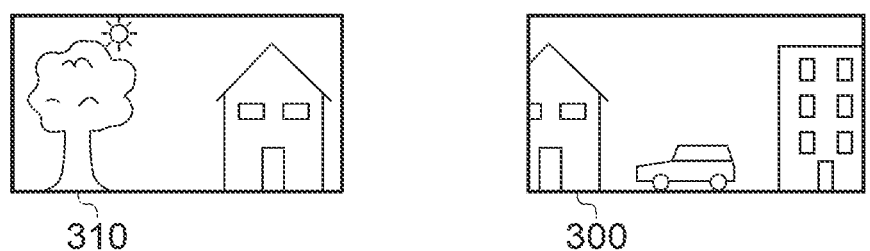

FIGS. 7A to 7C illustrate the increase in viewable imagery which may be achieved when the binocular overlap is reduced and the FOV increased. When the display elements are toed-out, as indicated schematically by the arrows 271 indicating that the right image is moved to the right, and the arrows 272 indicating that the left image is moved to the left as part of the toeing-out, the binocular overlap is reduced, which in turn reduces the overlapping portion 270 of the images provided to the user's eyes. The reduction in overlap allows the portions 240 and 250 of the image 230 to be shifted left and right respectively as illustrated in FIG. 7B, thus providing the user with an increase in the overall viewable area 260 of the image 230. The images provided to the user's right-hand 300 and left-hand 310 eyes by the left-hand and right-hand display elements respectively, after toeing-out are illustrated in FIG. 7C. It should be noted that the description of toeing out provided with respect to FIGS. 7A to 7C is just for an illustration of the principles involved. It is of course possible, though not a requirement, that the "toe" of an HMD may be user-adjustable. However, in other embodiments the toe would be set at manufacture, so the changes illustrated in FIGS. 7A to 7C are simply to indicate the difference between HMDs having two different toe settings.

However, when display elements of an HMD are toed-out, retinal rivalry may occur because the user may only see portions of the central nasal zone in one eye, where normally images of the same scene would be observed by both eyes. Retinal rivalry occurs when a substantially different image is provided to each eye of a user where user's brain would normally expect to be provided with two similar images of a same scene. For example, in human vision a central region of a FOV is binocular such that both eyes can receive images from the central nasal region and a 3 dimensional image can be rendered by the brain by combining the images from each eye. However, when each eye is provided with a substantially different image in the expected binocular region the brain may be unable to properly render an image due to conflicting individual images. This may lead to an unstable image being rendered by the brain or unwanted visual artefacts appearing in the rendered image. In a binocular HMD retinal rivalry may lead to an exaggeration of the edges of the display elements in the user's vision, causing a psychophysical effect called "luning". The effect of luning refers to the introduction of darkness into the central nasal zone of the user's vision thus adversely affecting the quality of the user's HMD experience.

Figure 8:
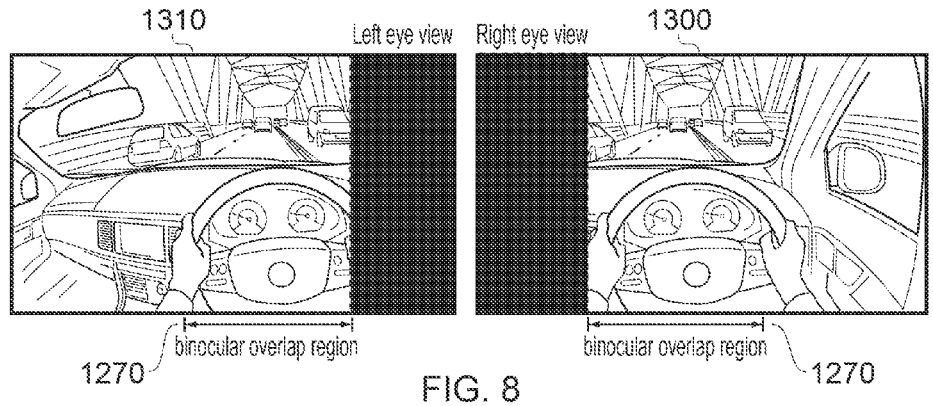
FIG. 8 schematically illustrates a left eye and a right eye view of an example image.
Figure 9:
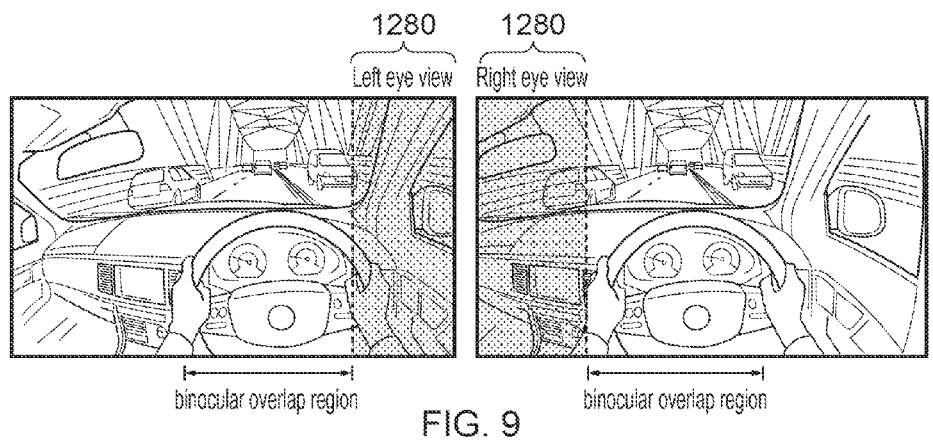
FIG. 9 schematically illustrates the so-called retinal rivalry zones in respect of the example image.

FIG. 8 schematically illustrates the left and right images (1310, 1300 respectively) of an example scene. The images are displayed, one to each eye, in such a way as to overlap by a binocular overlap region 1270 similar to the region 270 in FIG. 7B. Referring to FIG. 9, so-called retinal rivalry occurs in the regions 1280 in which one eye, but not both eyes, can see part of the scene.

Figure 10:
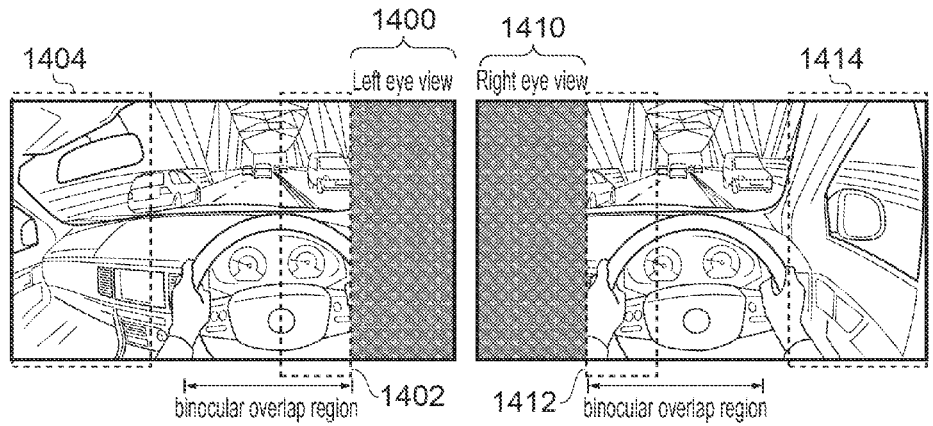
FIG. 10 schematically illustrates an embodiment of a luning reduction arrangement.

FIG. 10 schematically illustrates one embodiment of a luning correction or alleviation arrangement in which a right-hand portion 1400 of the left image and a left-hand portion 1410 of the right image are illuminated. The portions 1400 and 1410 are not parts of the left or right images but instead are extended from or appended to the edge of the respective image. So, the extent of the image data which is being displayed to the user, and the size of the binocular overlap region 1270, does not change by the addition of the illuminated regions 1400 and 1410.

The illuminated regions 1400 and 1410 can be generated by the use of a single LED or a small number of LEDs spaced apart from one another (for example, between 2 and 20 LEDs), arranged behind or with respect to a diffuser screen size to provide a generally uniform illumination of the respective region 1400, 1410.

The level of illumination (the brightness) of the two illuminated regions, and optionally the colour of the illumination, can be set according to various different optional criteria.

In one example embodiment, the colour can be set to a greyscale value and the illumination (brightness) set to a mid-grey value, for example corresponding to 50% grey. In other words, in this simple arrangement, the illumination is independent of the image content of the left and right images.

In another example, the brightness and/or colour by which a region is illuminated can be made dependent upon the image content immediately adjacent to that region. This is illustrated schematically in FIG. 10, so that the brightness and/or colour of the region 1400 (appended to the right-hand edge of the left image) is dependent upon the brightness and/or colour of an adjacent region 1402 of the left image. The extent of the adjacent region 1402 is arbitrary, in that a different image width and/or height to those shown in FIG. 10 could be used for the extent of the adjacent region 1402. Similarly, the brightness and/or colour of the region 1410 (appended to the left-hand edge of the right image) can be made dependent upon the brightness and/or colour of an arbitrarily sized portion 1412 of the right image.

In a further option, the brightness and/or colour of the illuminated regions 1400, 1410 can be made dependent upon the brightness and/or colour of that part of the scene which the user would see at that position using his other eye. So, in this example, the brightness and/or colour of the region 1410 appended to the left edge of the right image can be made dependent upon the brightness and/or colour of a portion 1404 of the left image corresponding to the position, within the scene, occupied by the region 1410. Similarly, the brightness and/or colour of the region 1400 can be made dependent upon the brightness and/or colour of a region 1414 of the right image.

In each of these examples in which the brightness and/or colour are made to be "dependent" upon the brightness and/or colour of an image portion, one option is simply to determine the average luminance (for example, the mean luminance) of that image portion and set this as the brightness by which the respective region is to be illuminated. In another option, the average luminance could be reduced by a predetermined factor (for example, be multiplied by 0.8) to generate the required illumination of the respective region 1400, 1410. A similar approach to either of these can be taken in respect of the colour by which the regions 1400, 1410 are illuminated, in that an average colour content of the respective image region can be assessed and used to control the colour by which the respective region 1400, 1410 is illuminated. The range of colours available across an array of pixels (such as those in an image region such as the region 1402) may be greater than the range of different colours which can be generated by one or a small number of LEDs, but if this is the case, the nearest available colour (or a generally near-matching colour) can be selected instead.

Figure 11:
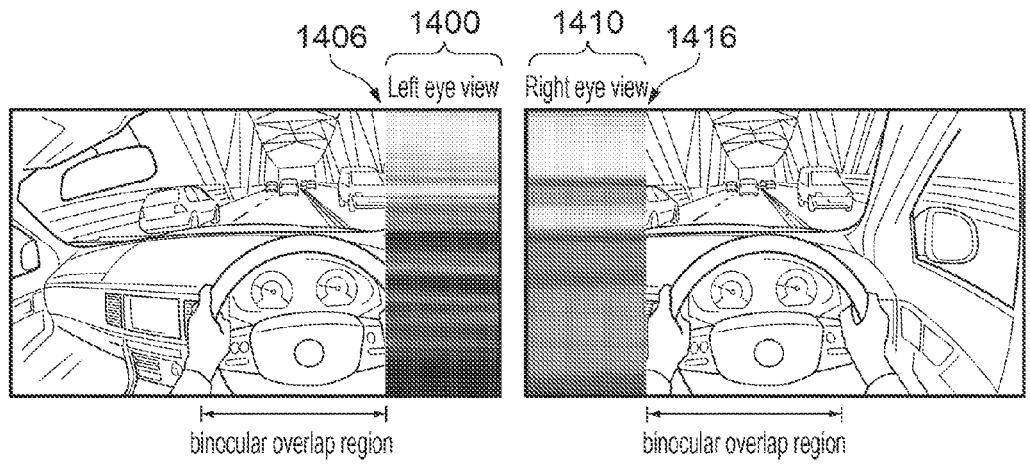
FIG. 11 schematically illustrates a second embodiment of a luning reduction arrangement.

FIG. 11 schematically illustrates another arrangement in which the brightness and colour of the illumination of the regions 1400, 1410 are set according to the brightness and colour of a column of pixels (1406, 1416) adjacent to the respective region. So, the brightness and colour of the region 1400 is set according to the brightness and colour of pixels in the column 1406 adjacent to the region 1400. This can be achieved by providing a column of LEDs to illuminate the region 1400 and another column of LEDs to illuminate the region 1410, controlling the brightness and colour of the illumination of each LED according to nearby pixels in the respective column 1406, 1416, and horizontally diffusing the light generated by those LEDs, for example using a grating-type diffuser positioned with the column of LEDs behind it.

Figure 12:
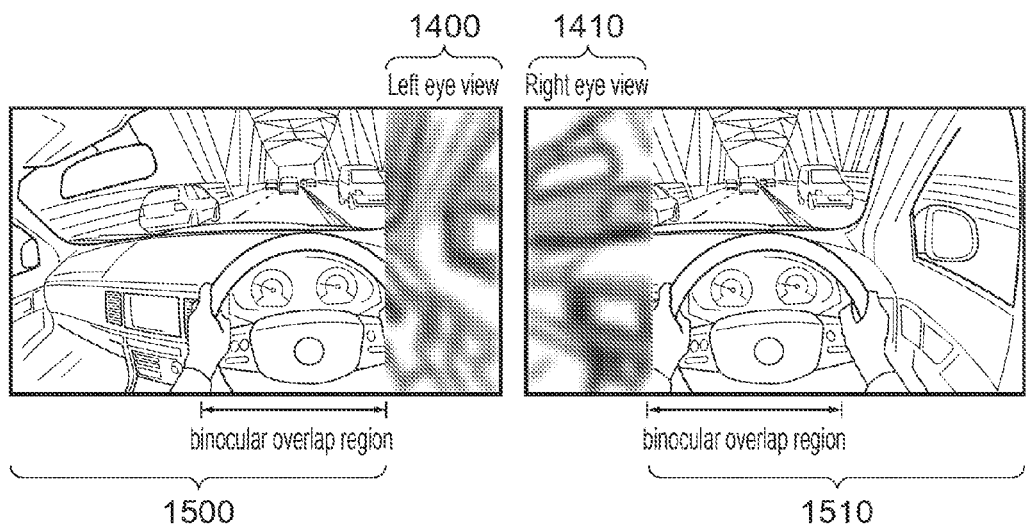
FIG. 12 schematically illustrates a third embodiment of a luning reduction arrangement.

In FIG. 12, the arrangement is similar to the option discussed above in which the brightness and/or colour of the illuminated regions 1400, 1410 can be made dependent upon the brightness and/or colour of that part of the scene which the user would see at that position using his other eye. So, in this example, the brightness and/or colour of the region 1410 appended to the left edge of the right image can be made dependent upon the brightness and/or colour of a portion 1404 of the left image corresponding to the position, within the scene, occupied by the region 1410. Similarly, the brightness and/or colour of the region 1400 can be made dependent upon the brightness and/or colour of a region 1414 of the right image. The difference between FIG. 12 and this option within the discussion of FIG. 10 is that in FIG. 12, multiple spaced-apart LEDs are provided behind a diffuser so as to provide a very low resolution diffused version of the image content in the respective portions 1404, 1414.

The same effect as that shown in FIG. 12 (or indeed as that shown in FIG. 10 or 11) could in fact be achieved by providing display elements which are arranged to display more pixels in a horizontal direction then are contained within the respective left and right images. An additional portion (corresponding in extent to that of the region 1400, 1410) to the appropriate edge of each main display portion (corresponding in extent to the left and right image displays 1500, 1510) can be used to provide the illumination of the regions 1400, 1410 instead of using a separate set of one or more LEDs. So in other words, two single display elements are provided, each having a suitable width to display both a respective main display portion 1500, 1510 and the respective region 1400, 1410.

In each case (FIG. 10, FIG. 11, FIG. 12), although in principle the additional display portion (acting as the region 1400 or the region 1410) can display images at the same resolution as the main part of the display, in some embodiments of the invention an image filtering arrangement can be used so that (a) in the case of FIG. 10, the additional display portion displays a single uniform colour and brightness derived as described above, (b) in the case of FIG. 11, the additional display portion displays an image which is derived from an adjacent column of pixels of the main image but which is low-pass filtered in the vertical direction and uniform in the horizontal direction, and (c) in the case of FIG. 12, the additional display portion displays a version of the image contained in the respective one of the regions 1404, 1414 but which is low-pass-filtered in the horizontal and vertical directions. In this last case (c), optionally a further low pass filter can be used in respect of pixels of the additional display portion adjacent to the boundary between the main part of the displayed image and the additional display portion, so as to reduce the magnitude of any transitions in brightness and/or colour between the edge pixels of the main display portion and the adjacent edge pixels of the additional display portion.

Figure 13:
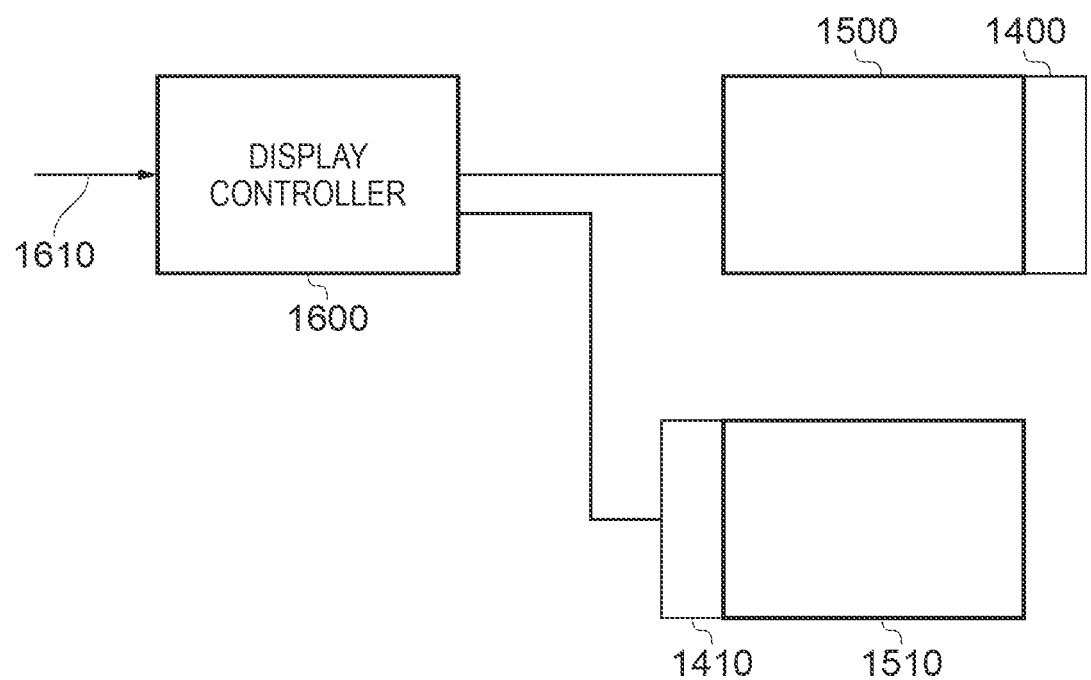
FIG. 13 schematically illustrates a control and display circuitry in respect of the embodiments of FIGS. 10 to 12.

An example of using an LED arrangement will be described with reference to FIGS. 15 to 17 below. FIG. 13 schematically illustrates an arrangement using an enlarged display element as just described. Here, two display elements are provided, one acting as the main display portion 1500 and the region 1400, and one acting as the main display portion 1510 and the region 1410. A display controller 1600 receives an input video signal 1610 having left image and right image components. The display controller is configured to pass the left and right images for display by the main display portions 1500, 1510, and to derive image data for display by the regions 1400, 1410 from the left and right images. Note that the derivation of the image data for display by the regions 1400, 1410 may include a spatial filtering process, as described above.

Figure 14:
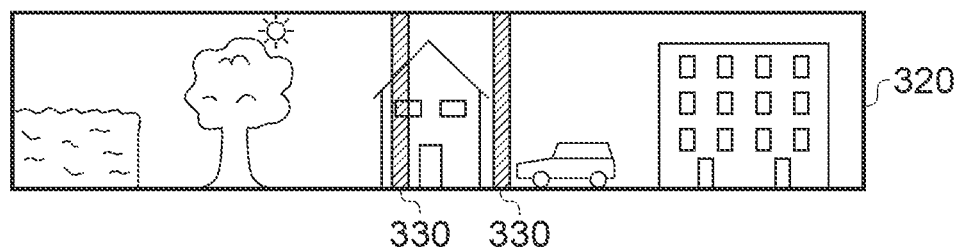
FIG. 14 schematically illustrates luning in an image provided by an HMD.

In another embodiment, FIG. 14 illustrates luning when displays are toed-out in order to increase a FOV of an HMD. The image provided to the user via images 300 and 310 from the display elements is illustrated by 320. However, where borders of the display elements occur darker portions 330 are introduced into the image. This darker region is luning and it may reduce the quality of the user experience provided by an HMD, therefore it is desirable to alleviate or reduce luning.

Figure 15:
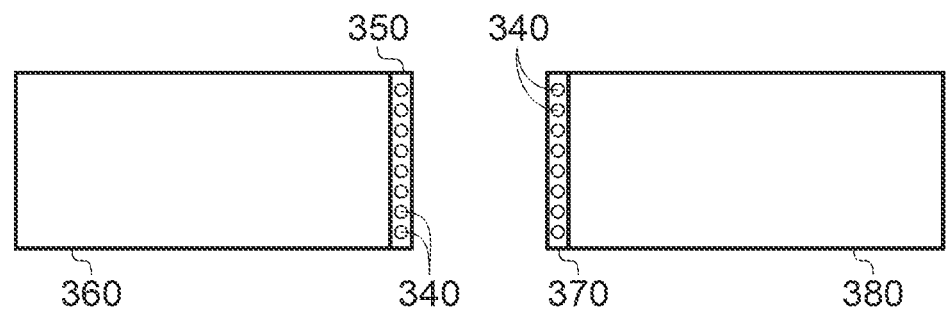
FIG. 15 schematically illustrates light emitting elements positioned on display elements of an HMD.

FIG. 15 provides a schematic illustration of display elements of an HMD which can reduce luning in accordance with an embodiment of the present invention. The display elements may be of any type discussed above but have at least one light emitting element 340 positioned on the right-hand periphery 350 of the left-hand display element 360 and at least one light emitting element 340 positioned on the left-hand periphery 370 of the right-hand display element 380.

The light emitting element(s) may be one or more LEDs, and may be disposed with respect to (for example, behind) a diffuser so as to provide a diffused light source rather than one or more point light sources. The light emitted by the light emitting elements 340 is controllable by a controller such that light emitted by the light emitting elements is dependent upon the video signals from which the images provided to the user's eyes by the display elements are from. More specifically, light emitted by the light emitting elements on the right-hand periphery of the left-hand display element is dependent upon the right-hand periphery of the image provided by the left-hand display element. Correspondingly, light emitted by the light emitting elements on the left-hand periphery of the right-hand display element is dependent upon the left-hand periphery of the image provided by the right-hand display element. The light emitted by the light emitting elements extends the images provided by the left-hand 360 and right-hand 380 display elements further into the central nasal area of a user's vision thus replacing the offending darkness with light which is at least generally or substantially matched to the images and reducing luning.

Examples of suitable light emitting elements (which are also applicable to the embodiments described earlier) may include LEDs, OLEDS, optical fibres coupled to light emitting elements, and pixels of an LCD. The light emitting elements on each periphery may be configured to emit light in a number of alternative manners depending upon, for example, the nature of the images being displayed by the display elements, the number of light emitting elements positioned on the relevant display element periphery, and a strength of the dependence between the emitted light and the periphery of the images being displayed by the display elements. Optical diffusing arrangements such as one or more diffuser screens may be provided so as to diffuse the light emitted by the light emitting elements. Examples of alternative manners in which the light emitting elements may emit light include each light emitting element emitting light of a different colour and or luminance, or one of more light emitting elements emitting light of a same or similar colour and or luminance.

Luning occurs at the border of the binocular overlap region of the images and therefore the light emitting elements which mitigate luning are only required on the left-hand periphery of the right-hand display element and the right-hand periphery of the left-hand display element. The present invention reduces luning whilst not adversely affecting the FOV of an HMD or reducing the quality of the user experience. Embodiments therefore enable a FOV of an HMD to be increased by an inexpensive toeing-out of display elements with little or no luning. Furthermore, the resolution of the light emitting elements of the example embodiments (size and spacing of the light emitting elements) may be substantially below that of resolution of the images provided to the user's eyes by the display elements. Consequently, the complexity and cost of the light emitting elements and the controller that controls them may be low. Embodiments therefore provides a low cost means to mitigate luning which occurs when an increase in the FOV is sought via toeing-out of display elements in an HMD.

In one embodiment a colour of light emitted by the light emitting elements on the left-hand display element corresponds to a colour of the right periphery of the image provided by the left-hand display element. Similarly, a colour of the light emitted by the light emitting elements on the right-hand display element corresponds to a colour of the left periphery of the image provided by the right-hand display element.

In another embodiment, a luminance of the light emitting elements on the left-hand display element (as set by the controller 400 or the display controller 1600) are higher than a luminance of the right-hand periphery of the image provided by the left-hand display element. Correspondingly, a luminance of the light emitting elements on the right-hand display element are higher than the luminance of the left-hand periphery of the image provided by the right-hand display element.

In some embodiments, both the colour and luminance of the light emitted by the light emitting elements may correspond to the colour and luminance of the left-hand and right-hand periphery of the images provided by the right-hand and left-hand display elements, respectively.

Figure 16:
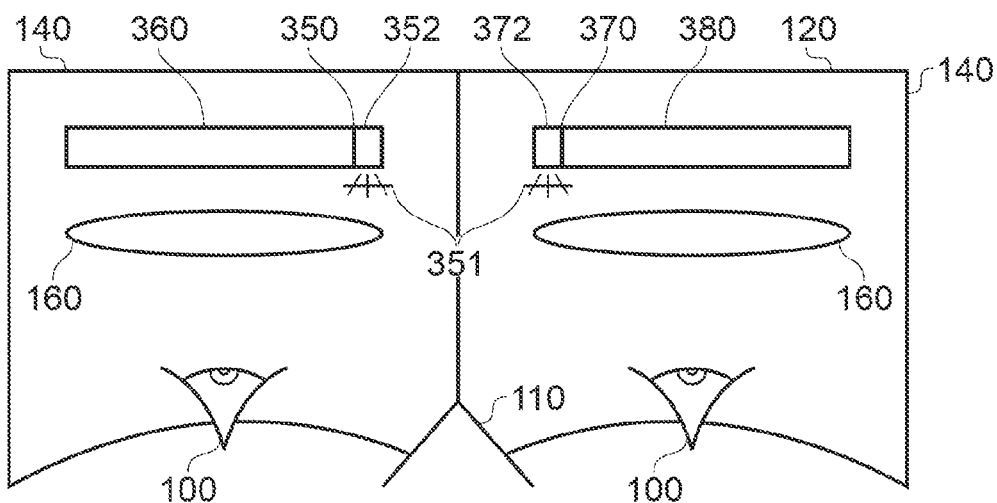
FIG. 16 schematically illustrates a plan view of light emitting elements positioned on displays of an HMD.

FIG. 16 illustrates an example embodiment integrated into a conventional HMD as described with reference to FIGS. 1 to 3 above. The display elements 360 and 380 correspond to 150 of FIG. 2 but with the addition of the light emitting elements 352 positioned on the right-hand periphery 350 of the left-hand display element 360 and the light emitting elements 372 positioned on the left-hand periphery 370 of the right-hand display element 380. A diffuser screen 351 is shown schematically in front of each array of light emitting elements.

Figure 17:
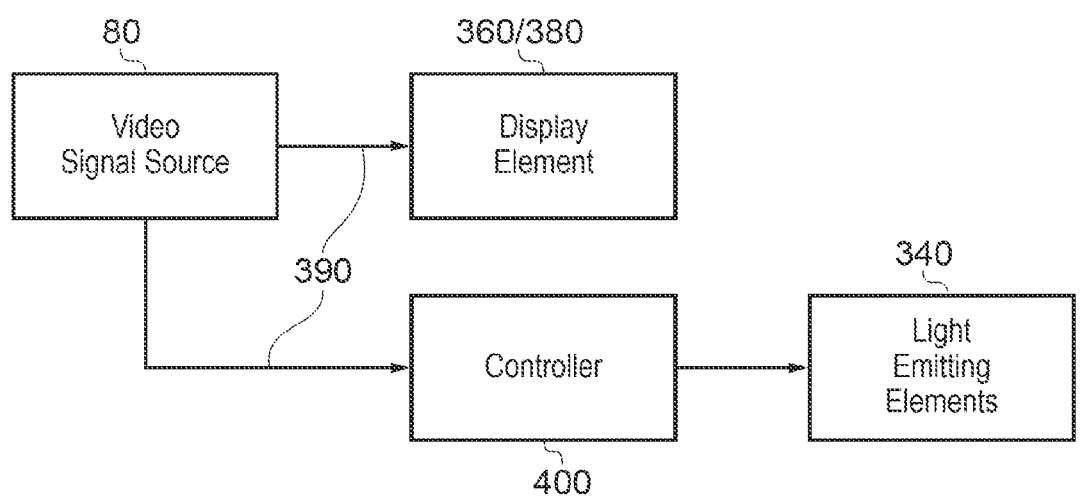
FIG. 17 schematically illustrates processing carried out on video signals.

FIG. 17 illustrates processing which is performed on video signals from a video signal source (particularly by the controller 400 or the display controller 1600) in accordance with an example embodiment. A video signal source 80 provides a video signal 390 to the display elements 360/380 and the controller 400 or the display controller 1600. The left-hand and right-hand display elements then display images provided by their respective video signals. The controller 400 or the display controller 1600 processes the video signals to extract information on which the light emitted by the light emitting elements is dependent upon. For example, in accordance with one embodiment the controller extracts colour information for the left-hand periphery of the image for the right-hand display element and controls the light emitting elements on the right-hand display element to emit corresponding colours. Similarly, the controller extracts colour information for the right-hand periphery of the image for the left-hand display element and controls the light emitting elements on the left-hand display element to emit corresponding colours. An equivalent process to that detailed above may also be performed with respect to the luminance of the relevant peripheries of the images provided by the display elements. The process of extracting the colour and/or luminance information may be performed in a number of alternative ways, for example, an average of the colours or luminance along the relevant periphery of the images provides by the display elements may be performed. Alternatively the colour and luminance information from predetermined pixels or areas of the relevant image periphery may be selected. When averaging is performed, the average may be performed most or all of the relevant image periphery or multiple averages may be performed on portions of the relevant image periphery. The averaged colours and luminances may then be mapped onto correspond groups of light emitted elements position on the display elements.

The techniques described above, and in particular (though not exclusively) the operations of the controller 400 and/or the display controller 1600, may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the invention.

Numerous modifications and variations of the present disclosure are possible in light of the above teachings. It is therefore to be understood that within the scope of the appended claims, the invention may be practised otherwise than as specifically described herein.

The invention claimed is:

1. A head-mountable display apparatus comprising:
   a frame configured to be mounted on a user's head, the frame defining a left-hand eye display position and a right-hand eye display position which, when in use, are positioned in front of the respective eye of the user;
   a left-hand display element mounted with respect to the left-hand eye display position, the left-hand display element being operable to provide an image from a left-hand video signal to the left-hand eye of the user;
   a right-hand display element mounted with respect to the right-hand eye display position, the right-hand display element being operable to provide an image from a right-hand video signal to the right-hand eye of the user;
   at least one light emitting element positioned adjacent a right-hand periphery of the left-hand display element;
   at least one light emitting element positioned adjacent a left-hand periphery of the right-hand display element; and
   a controller operable to control light emitted by the light emitting elements dependent upon the video signals to mitigate luning, in which the light emitted by the at least one light emitting element on the left-hand display element is dependent upon image content of the right-hand image, and the light emitted by the at least one light emitting element on the right-hand display element is dependent upon the image content of the left-hand image respectively.

2. An apparatus according to claim 1, in which the light emitted by the at least one light emitting element on the left-hand display element is dependent upon a portion of the image provided by the right-hand display element but not by the left-hand display element, and the light emitted by the at least one light emitting element on the right-hand display element is dependent upon a portion of the image provided by the left-hand display element but not by the right-hand display element.

3. An apparatus according to claim 1, in which the display elements are selected from a group of display elements comprising transmissive, reflective, self-emissive and scanning display elements.

4. An apparatus according to claim 1, in which the light emitting elements are light emitting diodes (LEDs).

5. An apparatus according to claim 1, comprising one or more diffusers for diffusing the light emitted by the one or more light emitting elements.

6. An apparatus according to claim 1, in which the light emitting elements are provided by additional pixels of the display elements adjacent to those pixels used to display the left-hand image and the right-hand image.

7. An apparatus according to claim 6, in which the controller is configured to generate pixel data from the left-hand image and the right-hand image, for display by the additional pixels.

8. An apparatus according to claim 7, in which the controller comprises a low-pass image filter.

9. An apparatus according to claim 1, in which the image provided by the left-hand display element is a virtual image of a video display of the left-hand video signal from a left-hand video signal source, and the image provided by the right-hand display element is a virtual image of a video display of the right-hand video signal from a right-hand video signal source.

10. A head-mountable display system comprising:
   an apparatus according to claim 1; and
   a video signal source operable to provide the right-hand video signal to the right-hand display element, provide the left-hand video signal to the left-hand display element, and provide the left-hand and right-hand video signals to the controller.

11. A method of operating a head-mountable display apparatus, the head-mountable display apparatus comprising a frame configured to be mounted on a user's head, the frame defining a left-hand eye display position and a right-hand eye display position which, when in use, are positioned in front of the respective eye of the user; a left-hand display element mounted with respect to the left-hand eye display position, the left-hand display element being operable to provide an image from a left-hand video signal to the left-hand eye of the user; a right-hand display element mounted with respect to the right-hand eye display position, the right-hand display element being operable to provide an image from a right-hand video signal to the right-hand eye of the user; at least one light emitting element positioned adjacent a right-hand periphery of the left-hand display element; and at least one light emitting element positioned adjacent a left-hand periphery of the right-hand display element; the method comprising
   controlling light emitted by the light emitting elements dependent upon the video signals to mitigate luning, wherein the light emitted by the at least one light emitting element on the left-hand display element is dependent upon image content of the right-hand image, and the light emitted by the at least one light emitting element on the right-hand display element is dependent upon the image content of the left-hand image respectively.

12. A non-transitory storage medium storing computer software thereon for carrying out a method according to claim 11.

\* \* \* \* \*